US008585227B2

(12) United States Patent
Sheu et al.

(10) Patent No.: US 8,585,227 B2
(45) Date of Patent: Nov. 19, 2013

(54) BACKLIGHT MODULE, AND PLANAR DISPLAY DEVICE AND PORTABLE ELECTRONIC DEVICE INCORPORATING THE SAME

(75) Inventors: Chia-Zen Sheu, New Taipei (TW); Chin-Wei Chiang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 13/608,287

(22) Filed: Sep. 10, 2012

(65) Prior Publication Data
US 2013/0107494 A1 May 2, 2013

(30) Foreign Application Priority Data

Nov. 1, 2011 (TW) .............................. 100139778 A

(51) Int. Cl.
*G01D 11/28* (2006.01)
(52) U.S. Cl.
USPC ....................................... 362/23.03; 362/97.3
(58) Field of Classification Search
USPC .............. 362/23.03, 23.19, 23.2, 23.21, 97.1, 362/97.2, 97.3, 249.01, 249.02, 249.1, 269, 362/276, 285, 311.01, 311.02, 561, 362/608–616, 800, 812
See application file for complete search history.

(56) References Cited

U.S. PATENT DOCUMENTS

| 5,379,201 A * | 1/1995 | Friedman ..................... 362/191 |
| 5,684,513 A * | 11/1997 | Decker ......................... 345/168 |
| 5,815,225 A * | 9/1998 | Nelson ........................... 349/65 |
| 6,380,921 B2 * | 4/2002 | Nakamura ..................... 345/102 |
| 6,776,497 B1 * | 8/2004 | Huppi et al. ..................... 362/85 |
| 7,090,368 B2 * | 8/2006 | Oross et al. ..................... 362/84 |
| 7,436,657 B2 * | 10/2008 | Motai et al. ............... 361/679.55 |
| 7,686,466 B2 * | 3/2010 | Lev et al. ......................... 362/23 |
| 8,223,487 B2 * | 7/2012 | Chen et al. ............... 361/679.57 |
| 8,305,746 B2 * | 11/2012 | Yokoyama et al. ....... 361/679.27 |
| 2002/0064055 A1 * | 5/2002 | Takahashi et al. ............ 362/555 |

FOREIGN PATENT DOCUMENTS

| CA | 2377052 C | 2/2007 |
| TW | 200915134 A | 4/2009 |
| TW | M395202 U1 | 12/2010 |
| TW | M404400 U1 | 5/2011 |

OTHER PUBLICATIONS

English Translation of Taiwanese Publication TW200915134A published on Apr. 1, 2009.

* cited by examiner

*Primary Examiner* — Hargobind S Sawhney
(74) *Attorney, Agent, or Firm* — The Mueller Law Office, P.C.

(57) ABSTRACT

A backlight module includes a lighting unit including a primary light guiding unit and a light source, and an auxiliary light guiding unit. The light source is disposed at one side of the primary light guiding unit, and emits light toward the primary light guiding unit to be guided thereby for projecting in a first direction. The auxiliary light guiding unit includes a light collecting portion disposed at one side of the lighting unit opposite to the first direction for collecting light leaking from the lighting unit, and a light guiding portion extending generally transversely from one end of the light collecting portion for guiding the light collected by the light collecting portion to emit in a second direction different from the first direction.

17 Claims, 10 Drawing Sheets

US 8,585,227 B2

BACKLIGHT MODULE, AND PLANAR DISPLAY DEVICE AND PORTABLE ELECTRONIC DEVICE INCORPORATING THE SAME

CROSS REFERENCE TO RELATED APPLICATION

This application claims priority of Taiwanese Application No. 100139778 filed on Nov. 1, 2011.

BACKGROUND OF THE INVENTION

1. Field of the Invention

The invention relates to a backlight module, more particularly to a backlight module capable of simultaneously providing light for image display and keyboard illumination, and a planar display device and a portable electronic device incorporating the same.

2. Description of the Related Art

Referring to FIG. 1, in Taiwanese Patent Application No. 494295, there is disclosed a notebook computer 1 including a cover body 10 that is provided with a display screen 11 and an LED lamp 12 at an upper end of the display screen 11 for illuminating a keyboard 14 of a main body 13 of the notebook computer 1 in a projecting manner. Referring to FIG. 2, according to the same patent, there is disclosed a light emitting keyboard 2 that includes a plurality of keys 21 and a light source module 22. Each of the keys 21 has a key cap 23 with a translucent region 24. The light source module 22 includes a light guide plate 25 disposed below the keys 21, and at least one light emitting component 26 mounted at a corner of the light guide plate 25. The light emitting component 26 emits light toward the light guide plate 25 for the light to be guided to travel along a light guide route (L) to pass through the translucent regions 24 of the keys 21. For keyboard illumination in the above manners, the light source (i.e., the LED lamp 12 of FIG. 1 and the light source module 22 of FIG. 2) is additionally and specifically provided for this purpose. In addition, for the light emitting keyboard 2, in addition to providing the light source module 22, the key caps 23 have to be specially manufactured to provide the translucent regions 24, increasing difficulty and cost of fabrication.

Referring to FIG. 3, a conventional edge type backlight module 3 for a liquid crystal display device includes an LED light source 31, and a reflecting plate 32, a light guide plate 33, a light diffusion plate 34, a light enhancing plate 35 and a light mask plate 36 arranged side by side in sequence from the LED light source 31. The LED light source 31 emits light to the light guide plate 33 so as to be guided thereby to travel in the same direction, such as a non-perpendicular direction away from an upper surface of the light guide plate 33. The light diffusion plate 34 diffuses the light from the light guide plate 33 uniformly to form a surface light. The light enhancing plate 35 focuses the light from the light diffusion plate 34 so as to increase forward luminance. The light mask plate 36 prevents the light from the light enhancing plate 35 from escaping from the peripheries of the conventional edge type backlight module so as to decrease optical loss and ensure that the light be projected onto a liquid crystal panel 37 arranged on the side of the light mask plate 36 opposite to the light enhancing plate 35. The current technology of the light guide plate 33 is unable to ensure that 100% of the light emitting from the LED light source 31 be guided to travel in that same direction. Therefore, the light reflecting plate 31 is provided to reflect light escaping from the light guide plate 33 in the wrong direction back toward the light guide plate 33.

SUMMARY OF THE INVENTION

Therefore, the main object of the present invention is to provide, for a planar display device or a portable electronic device that comes with a planar display, a backlight module that utilizes the escaped light for keyboard illumination so that an additional light source for keyboard illumination is unnecessary, while ensuring that keyboard illumination is achieved by a relatively simple fabrication process and at a relatively low cost.

According to one aspect of the present invention, there is provided a portable electronic device that includes a main body and a cover body. The main body has an upper surface that is provided with a keyboard. The cover body is connected pivotably to a lateral side of the main body so as to be operable to be disposed in a covering position, where the cover body covers the main body, and in an upright position, where the cover body uncovers the main body and is positioned upright at the lateral side of the main body. The cover body includes a back cover, a display panel, a front frame and a backlight module. The display panel is mounted to the back cover. The front frame is disposed on the display panel opposite to the back cover, surrounds a periphery edge of the display panel, and has a lower portion formed with a light-emitting hole. The light-emitting hole faces the keyboard when the cover body is disposed in the upright position. The backlight module is disposed between the display panel and the back cover, and includes a lighting unit that includes a primary light guiding unit and a light source, and an auxiliary light guiding unit. The light source is disposed at one side of the primary light guiding unit, and emits light toward the primary light guiding unit to be guided by the primary light guiding unit for projecting toward the display panel. The auxiliary light guiding unit includes a light collecting portion that is disposed between the lighting unit and the back cover for collecting light leaking from the lighting unit, and a light guiding portion that extends generally transversely from one end of the light collecting portion to the light-emitting hole of the front frame for guiding the light collected by the light collecting portion to emit through the light-emitting hole so as to illuminate the keyboard.

According to another aspect of the present invention, there is provided a planar display device that includes a back housing, a display panel, a front frame, and a backlight module. The display panel is mounted in the back housing. The front frame is disposed on the display panel opposite to the back housing, surrounds a periphery edge of the display panel, and has a lower portion that is formed with a light-emitting hole. The backlight module is disposed between the display panel and the back housing, and includes a lighting unit that includes a primary light guiding unit and a light source, and an auxiliary light guiding unit. The light source is disposed at one side of the primary light guiding unit, and emits light toward the primary light guiding unit to be guided by the primary light guiding unit for projecting toward the display panel. The auxiliary light guiding unit includes a light collecting portion that is disposed between the lighting unit and the back housing for collecting light leaking from the lighting unit, and a light guiding portion that extends generally transversely from one end of the light collecting portion to the light-emitting hole of the front frame for guiding the light collected by the light collecting portion to emit through the light-emitting hole.

According to yet another aspect of the present invention, there is provided a backlight module including a lighting unit that includes a primary light guiding unit and a light source, and an auxiliary light guiding unit. The light source is disposed at one side of the primary light guiding unit, and emits light toward the primary light guiding unit to be guided by the primary light guiding unit for projecting in a first direction. The auxiliary light guiding unit includes a light collecting portion that is disposed at one side of the lighting unit opposite to the first direction for collecting light leaking from the lighting unit, and a light guiding portion that extends generally transversely from one end of the light collecting portion for guiding the light collected by the light collecting portion to emit in a second direction different from the first direction.

The advantages of the present invention lie in that by providing the auxiliary light guiding unit in the backlight module of a portable electronic device or of a planar display device to collect the light leaking from the lighting unit and guide the same through the light-emitting hole for illuminating an object, such as a keyboard of the portable electronic device or a keyboard disposed in front of the planar display device, an additional illumination lamp for the keyboard or a light emitting keyboard is not necessary, thereby reducing the cost. In addition, the auxiliary illumination is provided by the present invention without complicating the fabrication process for the backlight module much.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
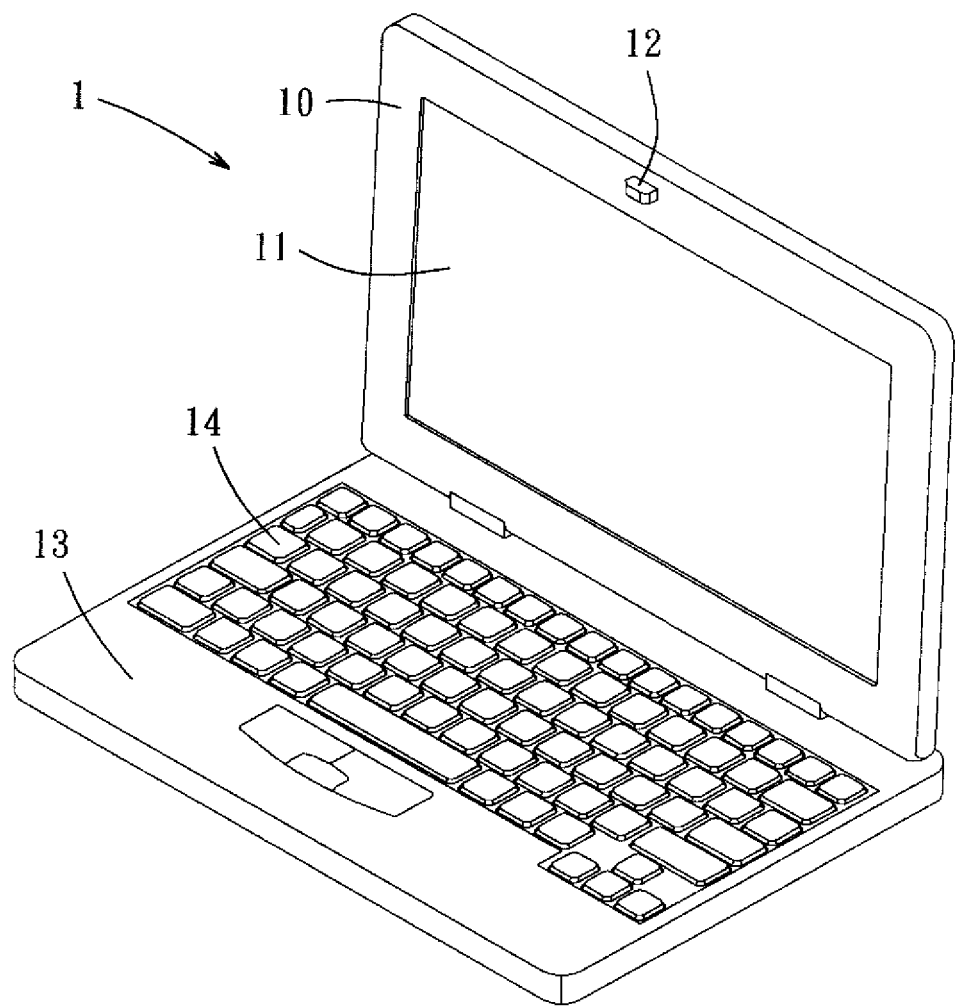
FIG. 1 is a schematic view of a conventional notebook computer provided with an LED lamp for keyboard illumination.
Figure 2:
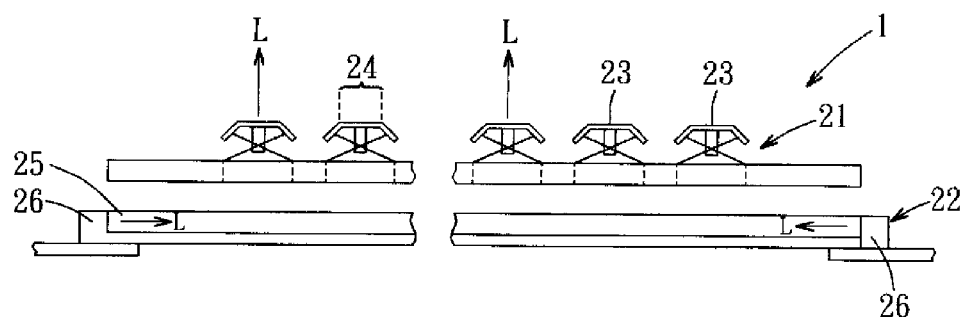
FIG. 2 is a schematic view of a conventional light emitting keyboard provided with a light source module.
Figure 3:
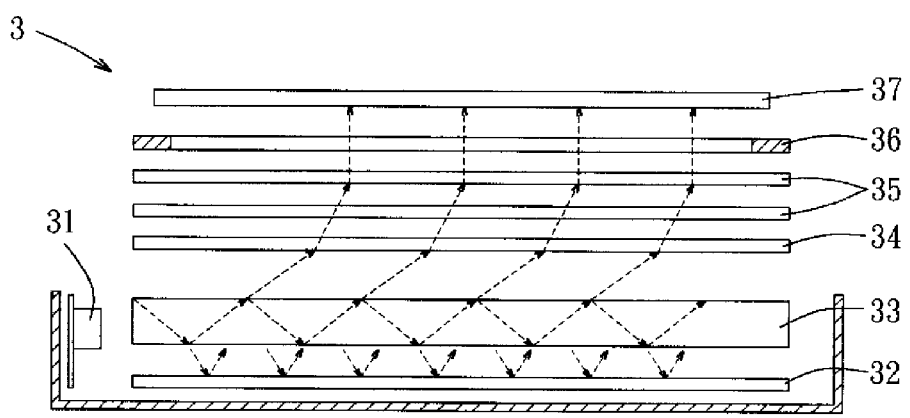
FIG. 3 is a sectional view of a conventional edge type backlight module.

Before the present invention is described in greater detail with reference to the accompanying preferred embodiment, it should be noted herein that like elements are denoted by the same reference numerals throughout the disclosure.

Figure 4:
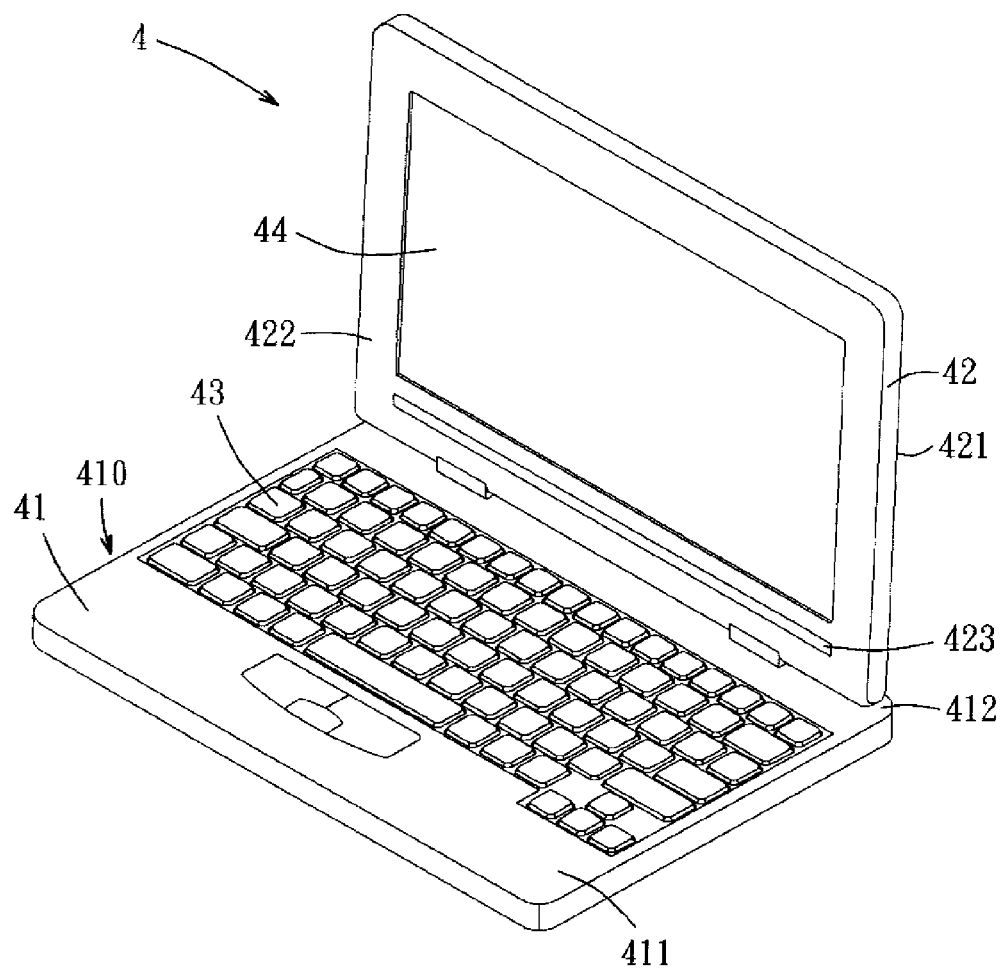
FIG. 4 is a schematic view of a portable electronic device according to the first preferred embodiment of the present invention.
Figure 5:
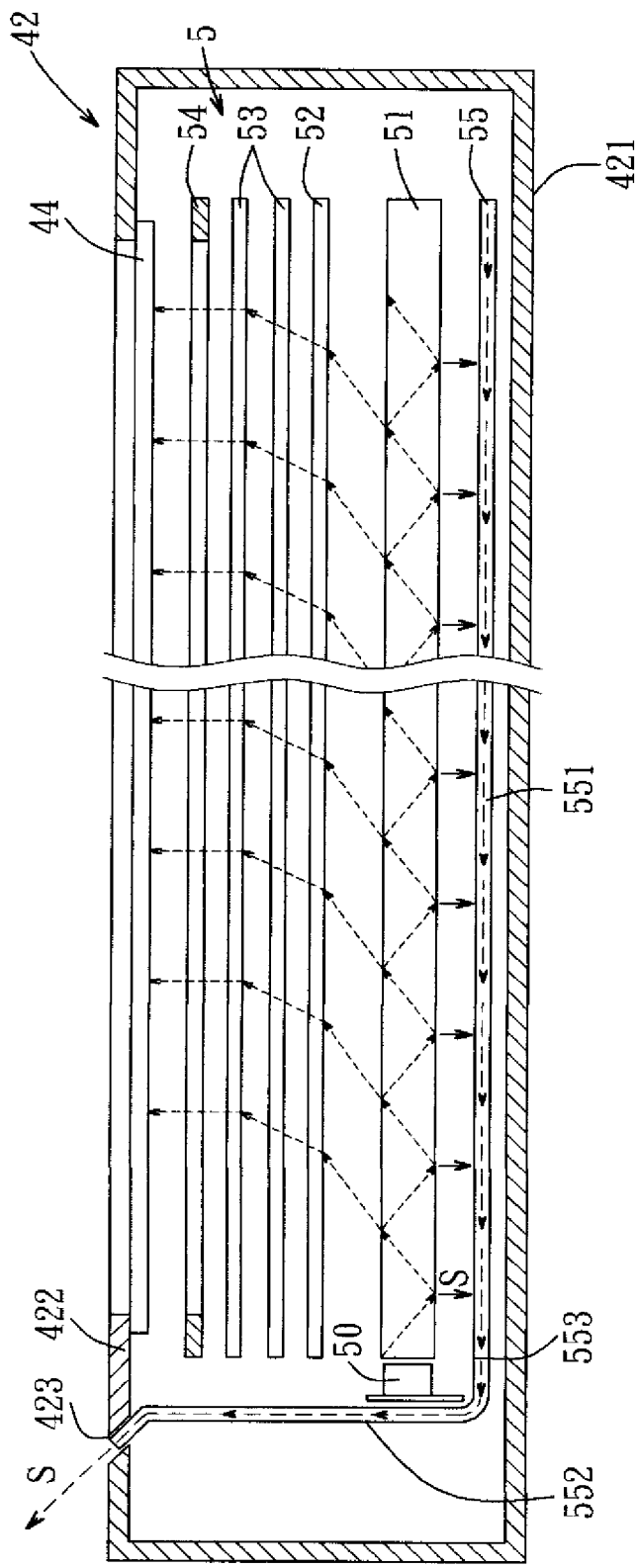
FIG. 5 is a sectional view of a backlight module according to the first preferred embodiment.

Referring to FIGS. 4 and 5, according to the first preferred embodiment of the present invention, a portable electronic device, which is shown as a notebook computer 4 for illustration, includes a main body 41 and a cover body 42. The main body 41 includes a housing 410, a circuit board (not shown) and other relevant electronic components disposed in the housing 410, and has an upper surface 411 that is provided with a keyboard 43.

The cover body 42 is connected pivotably to a lateral side 412 of the main body 41 so as to be operable to be disposed in a covering position, where the cover body 42 covers the upper surface 411 of the main body 41, and in an upright position, where the cover body 42 uncovers the main body 41 and is positioned upright at the lateral side 412 of the main body 41. The cover body 42 includes a back cover 421, a display panel 44 mounted to the back cover 421, a front frame 422 disposed on the display panel 44 opposite to the back cover 421 and surrounding a periphery edge of the display panel 42, and a backlight module 5 disposed between the display panel 44 and the back cover 421 and providing backlight for the display panel 44. In this embodiment, the display panel 44 is a liquid crystal display panel, and the front frame 422 has a lower portion formed with an elongated light-emitting hole 423 extending in a horizontal direction. As shown in FIG. 5, the light-emitting hole 423 is formed through the front frame 422 in an inclined downward direction so as to form an acute angle with an imaginary extension line of a lower edge of the front frame 422, and faces the keyboard 43 when the cover body 42 is disposed in the upright position.

As shown in FIG. 5, the backlight module 5 includes a lighting unit that includes a light source 50 and a primary light guiding unit. The primary light guiding unit includes a first light guide plate 51, a light diffusion plate 52, a light enhancing plate 53 and a light mask plate 54 disposed side by side in sequence. The light source 50 may be a cold cathode fluorescent lamp (CCFL), a hot cathode fluorescent lamp (HCFL), or an electroluminescent (EL) lamp. In this embodiment, the lighting unit is an edge type lighting unit, and the light source 50 is disposed to emit light toward a side edge of the first light guide plate 51 for the first light guide plate 51 to guide the light to leave the first light guide plate 51 to travel along a same direction, e.g., a direction non-perpendicular to the first light guide plate 51. The light diffusion plate 52 diffuses the light from the first light guide plate 51 uniformly to form a surface light. The light enhancing plate 53 focuses the light from the light diffusion plate 52 so as to increase forward luminance. The light mask plate 54 prevents the light from the light enhancing plate 53 from escaping from the peripheries of the backlight module 5 so as to decrease optical loss and ensure that the light be projected onto the display panel 44 arranged on the side of the light mask plate 54 opposite to the light enhancing plate 53.

However, since the light entering the first light guide plate 51 will not be 100% directed to travel along the same direction, a portion thereof will escape from a side of the first light guide plate 51 opposite to the diffusion plate 52. In order to make the best use of the escaping light source, the backlight module 5 of this embodiment further includes an auxiliary light guiding unit for guiding the escaped light to the light-emitting hole 423 of the front frame 422 for illumination, not as the backlight of the display panel 44, but of our purposes, such as for keyboard illumination. Specifically, in this embodiment, the auxiliary light guiding unit is a second light guide plate 55 that includes a light collecting portion 551 disposed between the first light guide plate 51 and the back cover 421 of the cover body 42 for collecting light leaking or escaping from said lighting unit, and a light guiding portion 552 extending generally transversely from one end of the light collecting portion 551 to the light-emitting hole 423 of the front frame 422 for guiding the light collected by the light collecting portion 551 to emit through the light-emitting hole 423 so as to illuminate the keyboard 43.

Figure 6:
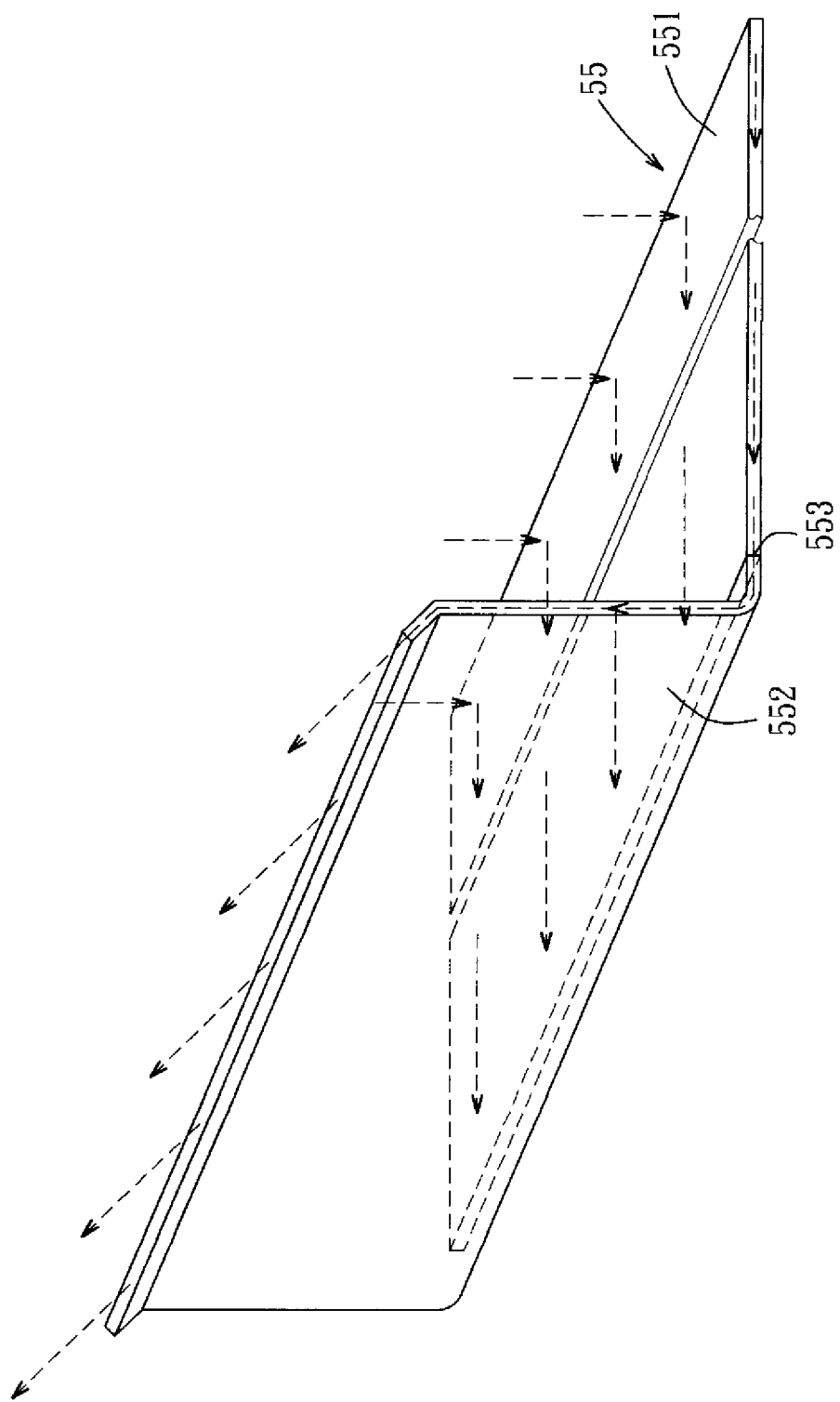
FIG. 6 is a schematic diagram for illustrating the structure of an auxiliary light guiding unit according to a first implementation of the first preferred embodiment.
Figure 7:
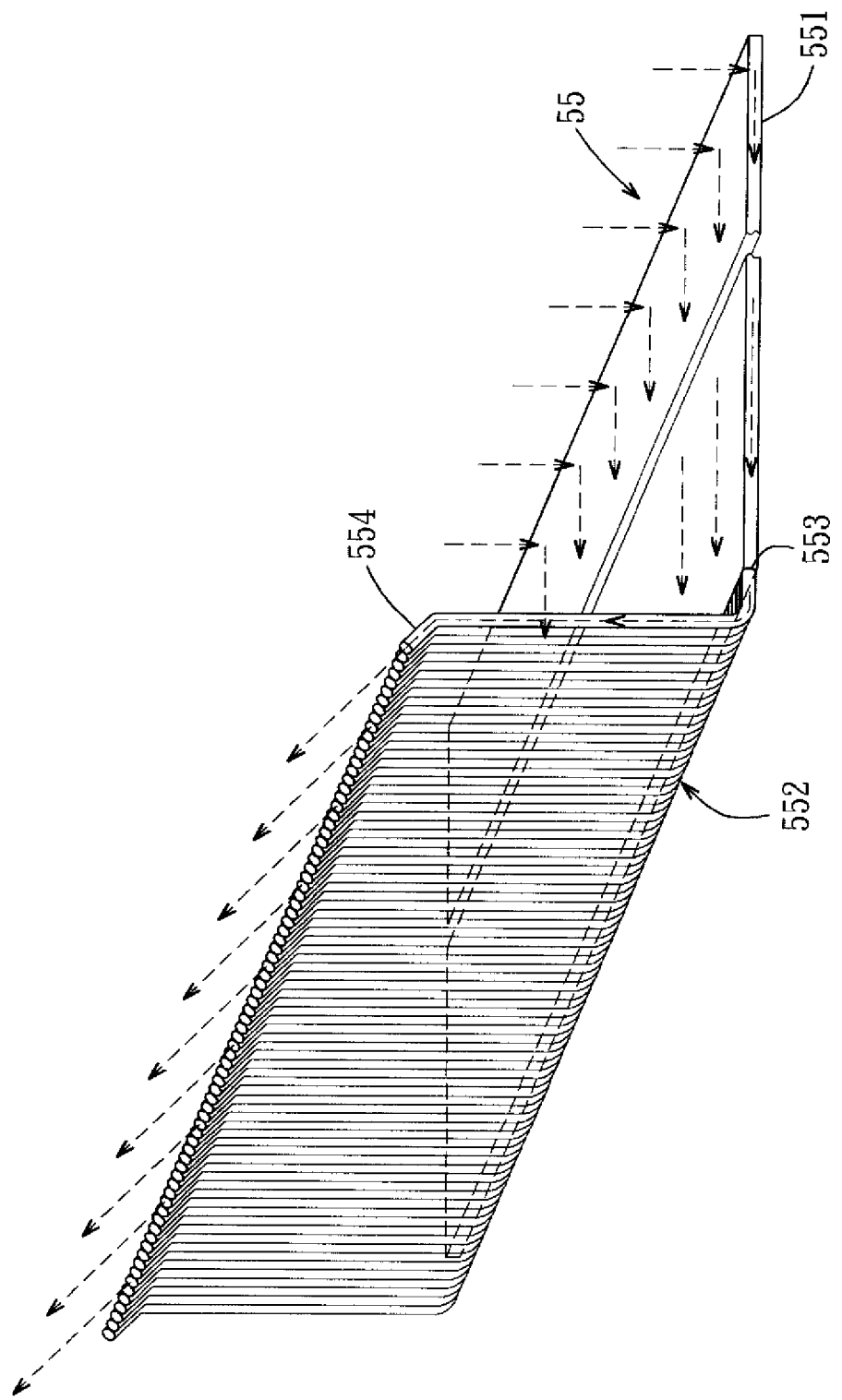
FIG. 7 is a schematic diagram for illustrating the structure of the auxiliary light guiding unit according to a second implementation of the first preferred embodiment.

According to a first implementation of the first preferred embodiment, further referring to FIG. 6, each of the first light guide plate 51 and the second light guide plate 55 is made of poly (methyl methacrylate) (PPMA), and the light collecting portion 551 and the light guiding portion 552 are integrally formed. Alternatively, according to a second implementation of the first preferred embodiment, as shown in FIG. 7, the light collecting portion 551 is in a plate form and is made of poly(methyl methacrylate) (PPMA), and the light guiding portion 552 is constituted by a plurality of fiber optics or a plurality of PMMA columns.

Figure 8:
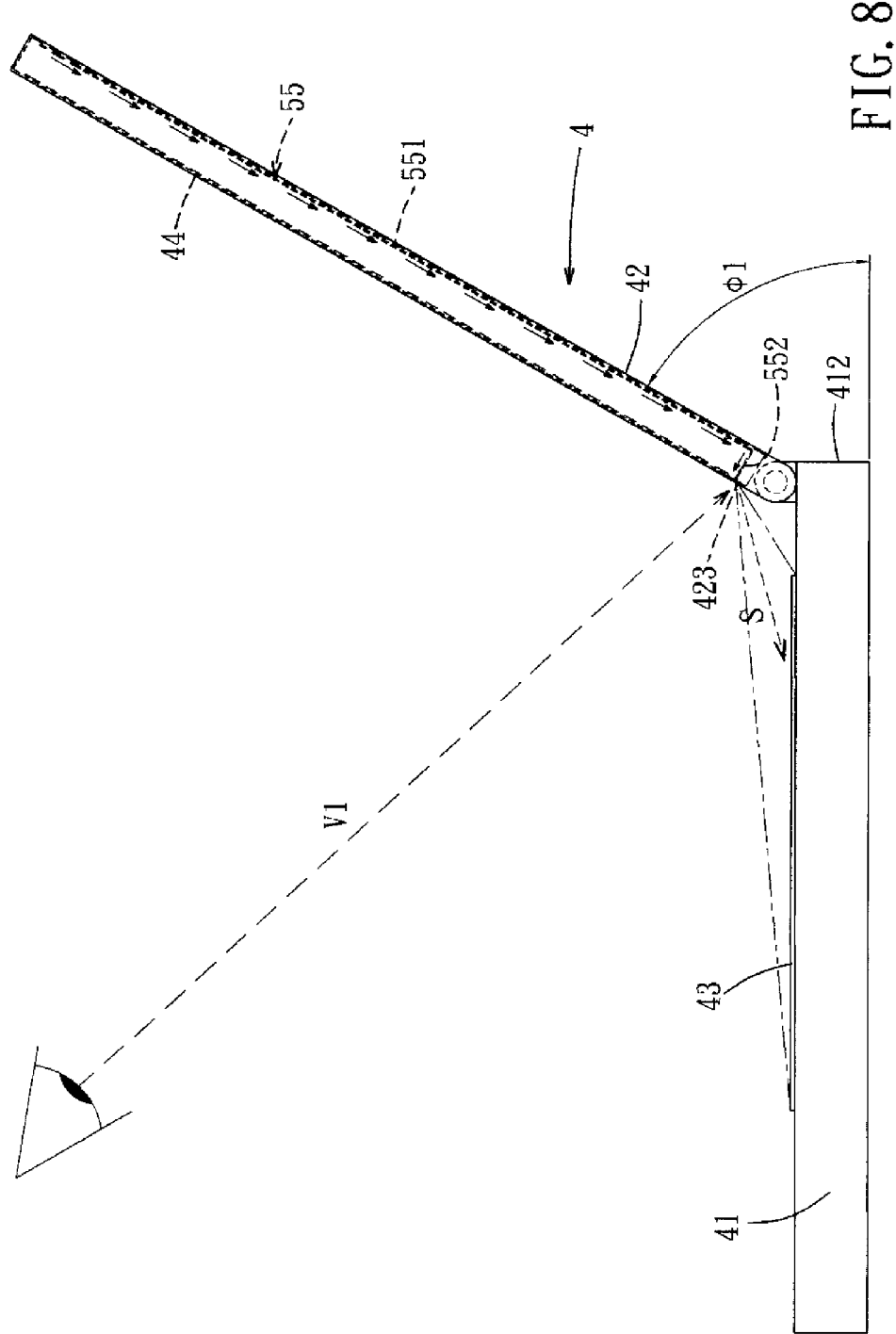
FIG. 8 is a schematic view of the portable electronic device during use.

Referring to FIG. 8, when the cover body 42 of the notebook computer 4 is disposed in the upright position and forms an obtuse angle ($\Phi 1$) with the main body 41, or the keyboard 43, the light (S) guided by the light guiding portion 552 of the second light guide plate 55 to emit through the light-emitting hole 423 will project over the keyboard 43 of the main body 41 for illumination. In the meantime, by directing the light (S) to travel toward the keyboard 43 in the inclined downward direction as confined by the light-emitting hole 423, a user with a viewing angle of (V1) is prevented from being directly exposed to the light (S) so that visual discomfort is not generated. Therefore, for the notebook computer 4 of this embodiment, with the provision of the auxiliary light guiding unit in the backlight module 5, when the display panel 44 is turned on, the light leaking from the lighting unit, or specifically from the first light guide plate 51 in this embodiment, can be collected as a light source for illuminating the keyboard 43 to assist in using the notebook computer 4 in the dark. In addition, this benefit is acquired with no additional cost.

With regard to the luminance of the light (S), referring to the following Table 1 extracted from an essay entitled "Application of Novel Stamper Fabrication to the Design of Integrated Light Guides of LCD" presented in "2009 Conference on Precision Machinery and Manufacturing Technology—PMMT 2009," the light output efficiency of an ordinary light guide plate ranges between 72% and 88%.

TABLE 1

|  | light output efficiency |
| --- | --- |
| Conventional type with no membrane | 80% |
| Conventional type with two BEFs | 72% |
| Integral type with no membrane | 88% |

The luminance of the backlight needed for an ordinary notebook computer 4 ranges between 60 and 300 nits. Assuming a user uses the notebook computer 4 in a dark place, and the backlight is at its dimmest state, i.e., with a luminance of 60 nits, and with an average light output efficiency of 80%, the light leaking from the first light guide plate 51 would be 60*(1−0.8)=12 nits. Further assuming that the light output efficiency of the second light guide plate 55 is also 80%, the light (S) coming out of the light-emitting hole 423 for illuminating the keyboard 43 would have a luminance of 12*0.8=9.6 nits. Generally speaking, the human eye can take in light of a lowest luminance of around 1.7 nits (referring to a night vision specification such as MIL-STD-3009). As such, the luminance of the light (S) guided by the second light guide plate 55 through the light-emitting hole 423 is sufficiently bright for the users to see the symbols on the keyboard 43.

Figure 9:
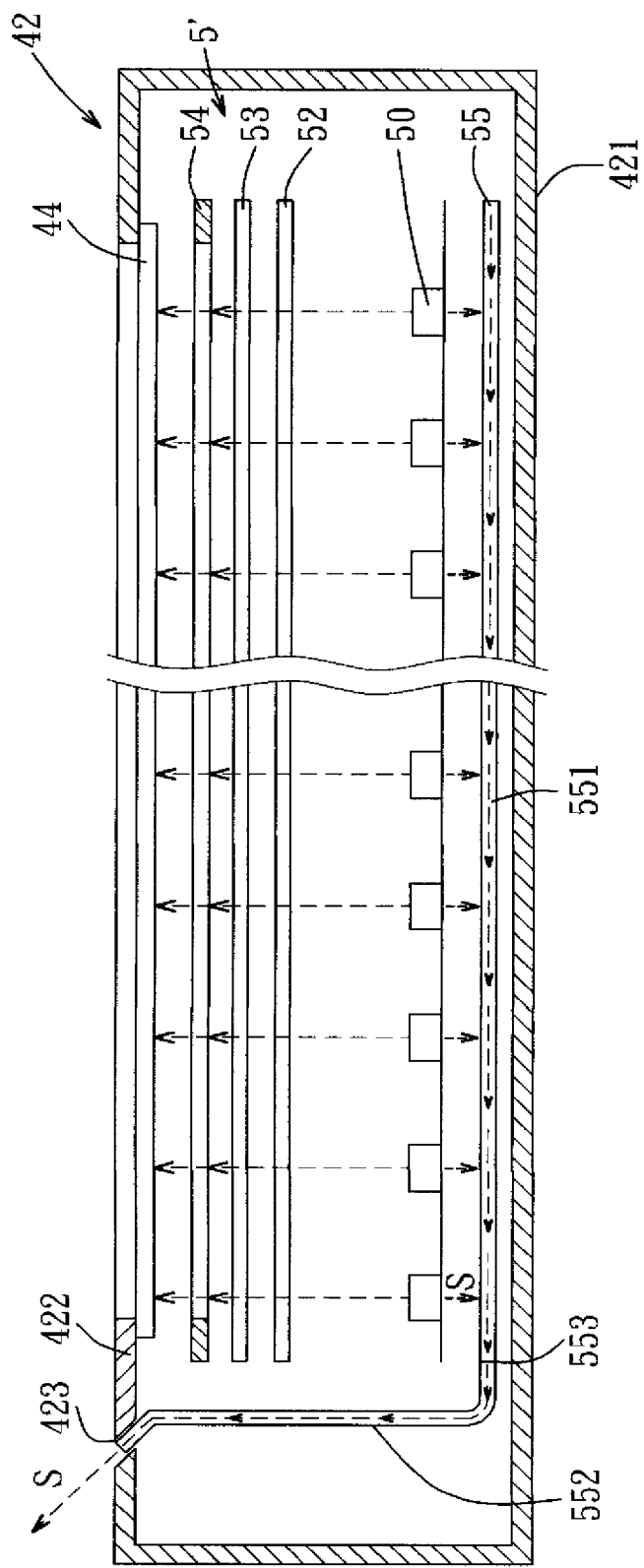
FIG. 9 is a sectional view of the backlight module according to the second preferred embodiment of the present invention.

Referring now to FIG. 9, according to the second preferred embodiment of the present invention, the lighting unit of the backlight module 5' is a direct type lighting unit. As such, the second preferred embodiment differs from the first preferred embodiment in that the primary light guiding unit of the lighting unit does not have the first light guide plate 51, and that the light source 50 is constituted by a plurality of light source units 50a arranged in an array and disposed to emit light toward the light diffusion plate 52 for the light to be diffused to form a surface light to travel in the first direction through the light enhancing plate 53 and the light mask 54 to the display panel 44. Since the light emitted from the light source units 50a will not travel to the light diffusion plate 52 at 100%, in the same token, by employing the auxiliary light guiding unit, which is also constituted by the second light guide plate 55 in this embodiment, the light leaking from the light source units 50a can be collected and guided to the light-emitting hole 423 of the front frame 422 of the cover body 42 as the light (S) for serving illumination purposes.

Figure 10:
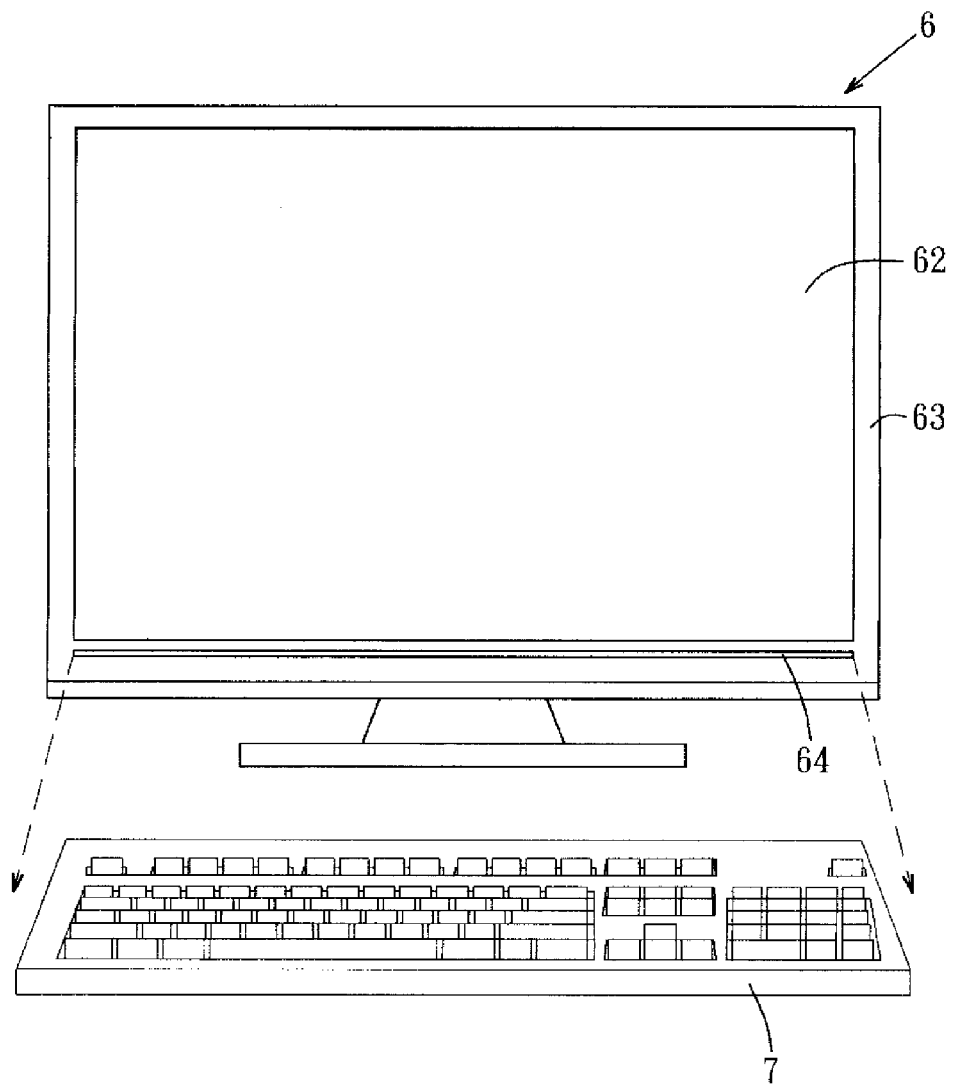
FIG. 10 is a schematic view of a planar display device according to the present invention.
Figure 11:
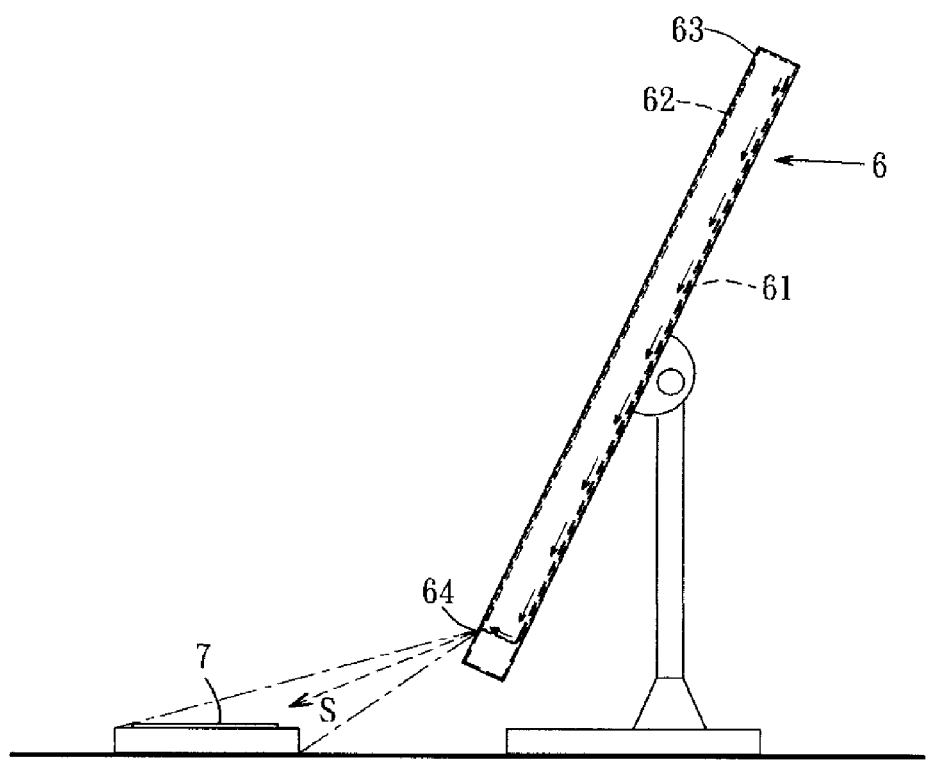
FIG. 11 is a schematic view of the planar display device during use.

Referring further to FIGS. 10 and 11, according to the present invention, the backlight module 5, 5' may be used in a planar display device 6. The planar display device 6 includes a back housing 61, a display panel 62 mounted in the back housing 61, a front frame 63 disposed on the display panel 62 opposite to the back housing 61, surrounding a periphery of the display panel 62, and the backlight module 5, 5' (as shown in FIG. 5 and FIG. 9) that is disposed between the display panel 62 and the back housing 61 to provide backlight for the display panel 62. In this embodiment, the display panel 62 is a liquid crystal display. Similarly, the front frame 63 has a lower portion that is formed with an elongated light-emitting hole 64 extending in a horizontal direction. The light-emitting hole 64 is formed through the front frame 63 in an inclined downward direction so as to form an acute angle with an imaginary extension line of a lower edge of the front frame 63. The light-emitting hole 64 is configured to face a keyboard 7 disposed in front of the planar display device 6. As such, when the planar display device 6 is in use, the light (S) guided by the light guiding portion 552 of the second light guide plate 55 to emit through the light-emitting hole 64 will illuminate over the keyboard 7. In the meantime, by directing the light (S) to travel toward the keyboard 7 in the inclined downward direction as confined by the light-emitting hole 64, a user is prevented from being directly exposed to the light (S) so that visual discomfort is not generated. Therefore, for the planar display device 6 of the present invention, with the provision of the auxiliary light guiding unit in the backlight module 5, 5', when the display panel 62 is turned on, the light leaking from the lighting unit, or specifically from the first light guide plate 51 or the light source units 50a, can be collected as a light source for illuminating an object, e.g., the keyboard 7, disposed in front of the planar display device 6. In addition, this benefit is acquired with no additional cost.

In summary, with the provision of the auxiliary light guiding unit in the backlight module 5, 5' for a portable electronic device or for a planar display device, light leaking or escaping from its intended path, i.e., to travel in a first direction to the display panel 44, 62, can be collected and subsequently guided to travel in a second direction other than the first direction through a light-emitting hole 423, 64 formed for confining emission of the light guided by the auxiliary light guiding unit to specifically illuminate in an inclined downward direction over an object, e.g., a keyboard 43, 7. In this manner, an additional illumination lamp or a special light-emitting keyboard is no longer necessary as with the prior art, and additionally, the manufacturing process and cost for providing keyboard illumination is reduced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A portable electronic device comprising:
a main body having an upper surface that is provided with a keyboard; and
a cover body connected pivotably to a lateral side of said main body so as to be operable to be disposed in a covering position, where said cover body covers said upper surface of said main body, and in an upright position, where said cover body uncovers said main body and is positioned upright at the lateral side of said main body, said cover body including
a back cover,
a display panel that is mounted to said back cover,
a front frame that is disposed on said display panel opposite to said back cover, that surrounds a periphery edge of said display panel, and that has a lower portion formed with a light-emitting hole, said light-emitting hole facing said keyboard when said cover body is disposed in the upright position, and
a backlight module that is disposed between said display panel and said back cover, and that includes
a lighting unit including a primary light guiding unit, and a light source that is disposed at one side of said primary light guiding unit, and that emits light toward said primary light guiding unit to be guided by said primary light guiding unit for projecting toward said display panel, and
an auxiliary light guiding unit including a light collecting portion that is disposed between said lighting unit and said back cover for collecting light leaking from said lighting unit, and a light guiding portion that extends generally transversely from one end of said light collecting portion to said light-emitting hole of said front frame for guiding the light collected by said light collecting portion to emit through said light-emitting hole so as to illuminate said keyboard.

2. The portable electronic device as claimed in claim 1, wherein said primary light guiding unit includes a first light guide plate and said auxiliary light guiding unit includes a second light guide plate that has said light collecting portion and said light guiding portion, said light collecting portion and said light guiding portion being integrally formed, each of said first and second light guide plates being made of poly(methyl methacrylate) (PPMA).

3. The portable electronic device as claimed in claim 1, wherein said light collecting portion of said auxiliary light guiding unit is a plate made of poly(methyl methacrylate) (PPMA), and said light guiding portion is constituted by one of a plurality of fiber optics and a plurality of PMMA columns.

4. The portable electronic device as claimed in claim 1, wherein said light-emitting hole is formed through said front frame in an inclined downward direction so as to form an acute angle with an imaginary extension line of a lower edge of said front frame.

5. The portable electronic device as claimed in claim 1, wherein said lighting unit is one of a direct type lighting unit and an edge type lighting unit.

6. A planar display device comprising:
a back housing;
a display panel mounted in said back housing;
a front frame disposed on said display panel opposite to said back housing, surrounding a periphery of said display panel, and having a lower portion that is formed with a light-emitting hole; and
a backlight module disposed between said display panel and said back housing, and including
a lighting unit including a primary light guiding unit, and a light source that is disposed at one side of said primary light guiding unit, and that emits light toward said primary light guiding unit to be guided by said primary light guiding unit for projecting toward said display panel, and
an auxiliary light guiding unit including a light collecting portion that is disposed between said lighting unit and said back housing for collecting light leaking from said lighting unit, and a light guiding portion that extends generally transversely from one end of said light collecting portion to said light-emitting hole of said front frame for guiding the light collected by said light collecting portion to emit through said light-emitting hole.

7. The planar display device as claimed in claim 6, wherein said light-emitting hole extends downwardly and inclinedly toward a lower edge of said front frame as to form an acute angle with an imaginary extension line of said lower edge.

8. The planar display device as claimed in claim 6, wherein said primary light guiding unit includes a first light guide plate and said auxiliary light guiding unit includes a second light guide plate that has said light collecting portion and said light guiding portion, said light collecting portion and said light guiding portion being integrally formed, each of said first and second light guide plates being made of poly (methyl methacrylate) (PPMA).

9. The planar display device as claimed in claim 6, wherein said light collecting portion of said auxiliary light guiding unit is a plate made of poly(methyl methacrylate) (PPMA), and said light guiding portion is constituted by one of a plurality of fiber optics and a plurality of PMMA columns.

10. The planar display device as claimed in claim 6, wherein said lighting unit is one of a direct type lighting unit and an edge type lighting unit.

11. A backlight module comprising:
a lighting unit including a primary light guiding unit, and a light source that is disposed at one side of said primary light guiding unit, and that emits light toward said primary light guiding unit to be guided by said primary light guiding unit for projecting in a first direction; and
an auxiliary light guiding unit including a light collecting portion that is disposed at one side of said lighting unit opposite to the first direction for collecting light leaking from said lighting unit, and a light guiding portion that extends generally transversely from one end of said light collecting portion for guiding the light collected by said light collecting portion to emit in a second direction different from the first direction.

12. The backlight module as claimed in claim 11, wherein said first and second directions form an acute angle therebetween, and said light guiding portion of said auxiliary light guiding unit has a straight section extending substantially transversely from said one end of said light collecting portion, and an inclined section connected to said straight section and extending away from said one end of said light collecting portion along the second direction.

13. The backlight module as claimed in claim 11, wherein said primary light guiding unit includes a first light guide plate and said auxiliary light guiding unit includes a second light guide plate that has said light collecting portion and said light guiding portion, said light collecting portion and said light guiding portion being integrally formed, each of said first and second light guide plates being made of poly (methyl methacrylate) (PPMA).

14. The backlight module as claimed in claim 11, wherein said light collecting portion of said auxiliary light guiding unit is a plate made of poly (methyl methacrylate) (PPMA), and said light guiding portion is constituted by one of a plurality of fiber optics and a plurality of PMMA columns.

15. The backlight module as claimed in claim 11, wherein said lighting unit is an edge type lighting unit, and said primary light guiding unit includes a first light guide plate, a diffusion plate, a light enhancing plate and a light mask plate disposed side by side in sequence, said light source being disposed to emit light toward a side edge of said first light guide plate.

16. The backlight module as claimed in claim 11, wherein said lighting unit is a direct type lighting unit, and said primary light guiding unit includes a diffusion plate, said light source being disposed to emit light toward said light diffusion plate for the light to be diffused to form a surface light that travels in the first direction.

17. The backlight module as claimed in claim 16, wherein said primary light guiding unit further includes a light enhancing plate disposed to receive the surface light from said light diffusion plate for enhancing the surface light, and a light mask plate disposed adjacent to said light enhancing plate opposite to said light diffusion plate.

* * * * *